United States Patent
Gaviani et al.

(10) Patent No.: US 10,435,012 B2
(45) Date of Patent: Oct. 8, 2019

(54) HYBRID VEHICLE PROVIDED WITH AN ELECTRONICALLY CONTROLLED TRANSMISSION

(71) Applicant: MAGNETI MARELLI S.p.A., Corbetta (IT)

(72) Inventors: Giovanni Gaviani, Rimini (IT); Cesare Sola, Cuorgne' (IT); Giuseppe Medico, Rivoli (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 309 days.

(21) Appl. No.: 15/439,273

(22) Filed: Feb. 22, 2017

(65) Prior Publication Data
US 2017/0240164 A1 Aug. 24, 2017

(30) Foreign Application Priority Data
Feb. 24, 2016 (IT) .................. 102016000019173

(51) Int. Cl.
*B60K 20/04* (2006.01)
*B60K 6/48* (2007.10)
(Continued)

(52) U.S. Cl.
CPC .............. *B60W 20/30* (2013.01); *B60K 1/02* (2013.01); *B60K 6/36* (2013.01); *B60K 6/48* (2013.01);
(Continued)

(58) Field of Classification Search
CPC ...... B60W 20/30; B60W 20/10; B60W 20/20; B60W 2050/0006; B60W 2540/10;
(Continued)

(56) References Cited

U.S. PATENT DOCUMENTS

| | | | |
|---|---|---|---|
| 2006/0190155 A1 | 8/2006 | Meyer et al. | |
| 2009/0057042 A1* | 3/2009 | Puccetti | B60K 6/485 180/65.265 |
| 2009/0143961 A1* | 6/2009 | Gaviani | B60Q 1/50 701/110 |

FOREIGN PATENT DOCUMENTS

| | | |
|---|---|---|
| JP | 2011183875 A | 9/2011 |
| WO | 2004024490 A1 | 3/2004 |

OTHER PUBLICATIONS

Italian Search Report dated Oct. 14, 2016 issued in Italian Patent Application No. UB20161013.

* cited by examiner

*Primary Examiner* — Jacob S. Scott
*Assistant Examiner* — Lillian T Nguyen
(74) *Attorney, Agent, or Firm* — Howard & Howard Attorneys PLLC

(57) ABSTRACT

A hybrid vehicle comprising: a pair of drive wheels; an internal combustion heat engine; an electrically controlled transmission; a control unit of the heat engine; a control unit of the transmission; a passenger compartment having a driver's seat provided with a plurality of controls that can be operated by the driver and comprise a steering wheel, an accelerator pedal, a brake pedal and transmission control means; and an electronic control unit of the transmission control means that is physically installed in the passenger compartment close to the transmission control means, fulfills the function of acquiring the current position of the transmission control means and also fulfills the function of vehicle management unit by receiving the orders given by the driver and by providing the control unit of the heat engine and the control unit of the transmission with the corresponding objectives to meet the driver's needs.

7 Claims, 4 Drawing Sheets

(51) Int. Cl.
*B60W 20/10* (2016.01)
*B60W 20/30* (2016.01)
*B60K 1/02* (2006.01)
*B60K 6/36* (2007.10)
*B60K 6/54* (2007.10)
*F16H 59/02* (2006.01)
*F16H 61/00* (2006.01)
*B60K 6/20* (2007.10)
*B60W 20/00* (2016.01)
*B60K 26/04* (2006.01)
*B60W 50/00* (2006.01)

(52) U.S. Cl.
CPC ............... *B60K 6/54* (2013.01); *B60K 20/04* (2013.01); *B60W 20/10* (2013.01); *F16H 59/0217* (2013.01); *F16H 61/0006* (2013.01); *B60K 6/20* (2013.01); *B60K 2026/046* (2013.01); *B60W 20/00* (2013.01); *B60W 2050/0006* (2013.01); *B60W 2540/10* (2013.01); *B60W 2540/12* (2013.01); *B60W 2540/16* (2013.01); *Y02T 10/6221* (2013.01)

(58) Field of Classification Search
CPC .......... B60W 2540/12; B60W 2540/16; B60K 6/36–54; B60K 2026/046; Y02T 10/6221
See application file for complete search history.

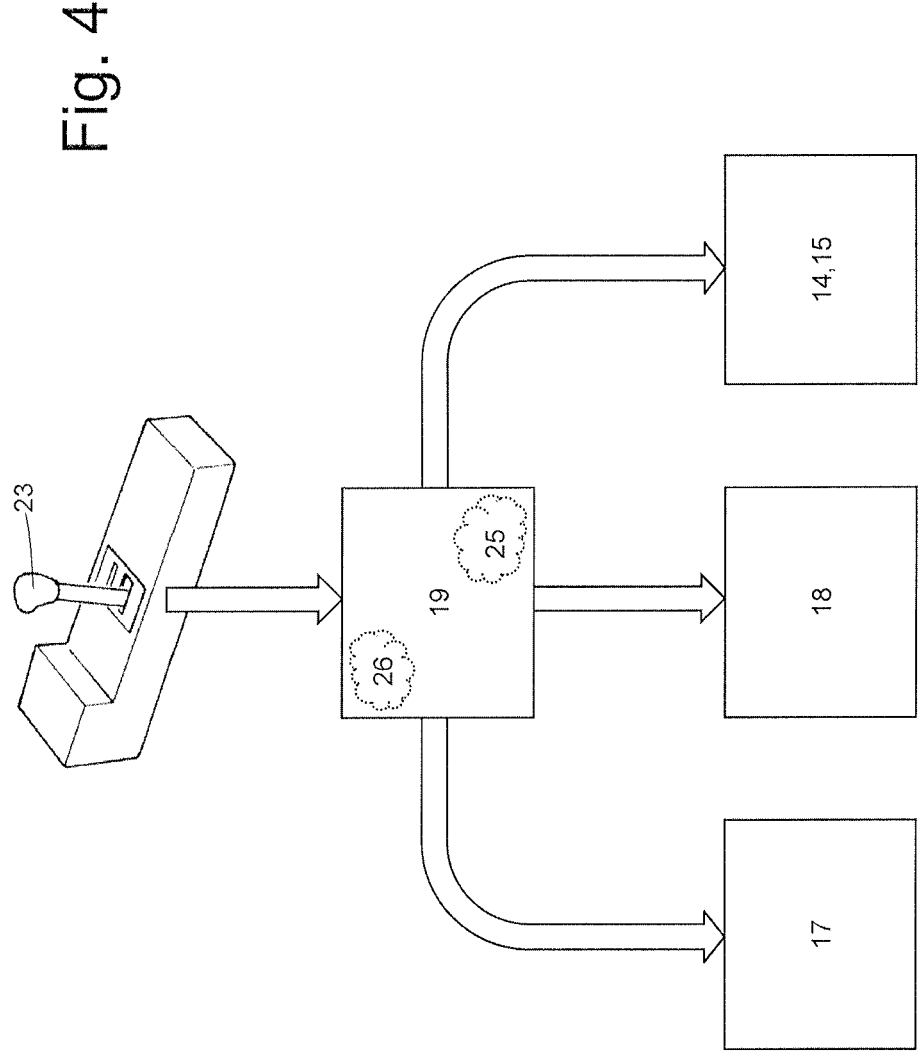

HYBRID VEHICLE PROVIDED WITH AN ELECTRONICALLY CONTROLLED TRANSMISSION

PRIORITY CLAIM

This application claims priority from Italian Patent Application No. 102016000019173 filed on Feb. 24, 2016, the disclosure of which is incorporated by reference.

TECHNICAL FIELD

The present invention relates to a hybrid vehicle provided with an electronically controlled transmission.

PRIOR ART

A modern vehicle provided with an electronically controlled transmission comprises a control unit of the heat engine that is physically installed in the engine compartment to be arranged close to the heat engine, supervises the operation of the heat engine and controls the heat engine to pursue a torque objective and/or an rpm objective. Moreover, a modern vehicle provided with an electronically controlled transmission comprises a transmission control unit that is physically installed close to the transmission, supervises the operation of the transmission and controls the transmission actuators to perform, when required, an upward or downward gear change. Finally, a modern vehicle provided with an electronically controlled transmission comprises a vehicle control unit (also called VMU—"Vehicle Management Unit"), which receives the orders given by the driver and provides the control unit of the heat engine, the control unit of the transmission and (if at least one electric machine is connected/connectable to the wheels) an electronic power converter driving the electric machine with the corresponding objectives to meet in the most effective (i.e. ready) and energy-efficient way the driver's needs.

In currently commercially available vehicles, the vehicle management unit is integrated in a dedicated electronic control unit that is physically arranged in the engine compartment, is separated and independent from the engine control unit and from the transmission control unit, and communicates with the engine control unit and with the transmission control unit through the vehicle CAN network.

The vehicle management unit receives the position of the controls operated by the driver (accelerator pedal, brake pedal and transmission control means) to acquire the driver's needs and then translates them in a longitudinal speed objective (with a direction, namely forwards or backwards) and, possibly, in a longitudinal acceleration objective for the vehicle. Then, the vehicle management unit determines how to pursue the longitudinal speed objective and the longitudinal acceleration objective by coordinating the action of the heat engine, of the transmission and, if present, of the electric machine, namely it establishes for the heat engine a torque objective and an rpm objective (objectives which can also have null values, corresponding to the heat engine shutdown), establishes for the transmission a gear ratio objective (which can also have a neutral position), and establishes for the electric machine a torque objective (which may be positive by operating as an engine or negative by operating as a generator) and an rpm objective (objectives which can also have null values, corresponding to the electric machine shutdown).

The patent application WO2004024490A1 describes a hybrid vehicle comprising:

a pair of drive wheels 9;
an internal combustion heat engine 1;
an automatic electronically controlled transmission 7 that transmits the torque from the heat engine 1 to the drive wheels 9;
an electric machine 3 that is connectable to the drive wheels 9;
an electronic power converter 5 (ISGS) that drives the electric machine 3;
a central control unit 2 (EMS/ETC) of the heat engine 1, which supervises the operation of the heat engine 1 and controls the heat engine 1 to pursue a torque objective and/or an rpm objective;
a central control unit 8 (EGS) of the transmission 7, which supervises the operation of the transmission 7 and controls the transmission 7 to perform, when required, a gear change;
a passenger compartment having a driver's seat provided with a plurality of controls that can be operated by the driver and comprise a steering wheel, an accelerator pedal 15, a brake pedal 16 and transmission control means;
an electronic control unit of the transmission control means (not shown and implicitly described), which is separate and independent from the central control unit 8 (EGS) of the transmission 7, is physically installed in the passenger compartment close to the transmission control means and fulfils the function of acquiring the current position of the transmission control means by directly receiving and thus processing the raw signals coming from at least one position sensor coupled to the transmission control means; and
a vehicle management unit 12 (IPM), which is separate and independent from the electronic control unit of the transmission control means and receives the orders given by the driver and provides the control unit 2 (EMS/ETC) of the heat engine 1, the control unit 8 (EGS) of the transmission 7 and the electronic power converter 5 (ISGS) with the corresponding objectives to meet the driver's needs. It is further specified (page 6, lines 21-24) that the vehicle management unit 12 (IPM) could be integrated in the control unit 2 (EMS/ETC) of the heat engine 1, in the electronic power converter 5 (ISGS) or in the control unit 8 (EGS) of the transmission 7.

The patent application US2006190155A1 describes a device for controlling an engine or a transmission of a vehicle; it is described (in paragraph [0036]) that the control device 4 of the transmission is arranged away from the transmission 2 and at (close to) the selection lever 14, e.g. in an encapsulated casing that surrounds the electronics and the mechanical components of the selection lever 14.

DESCRIPTION OF THE INVENTION

The object of the present invention is optimizing the manufacture of the vehicle management unit, both to simplify the connection of the vehicle management unit to all the components to which it must be connected and to minimize the production costs of the vehicle management unit; in this way, it is possible to manufacture a hybrid vehicle provided with an electronically controlled transmission which is easy and inexpensive to manufacture.

According to the present invention, it is provided a hybrid vehicle provided with an electronically controlled transmission, as claimed in the appended claims.

BRIEF DESCRIPTION OF THE DRAWINGS

The present invention will now be described with reference to the accompanying drawings showing a non-limiting embodiment, wherein:

FIG. 4 is a diagram showing the logical connections among the various electronic control units of the vehicle of FIG. 1.

PREFERRED EMBODIMENTS OF THE INVENTION

Figure 1:
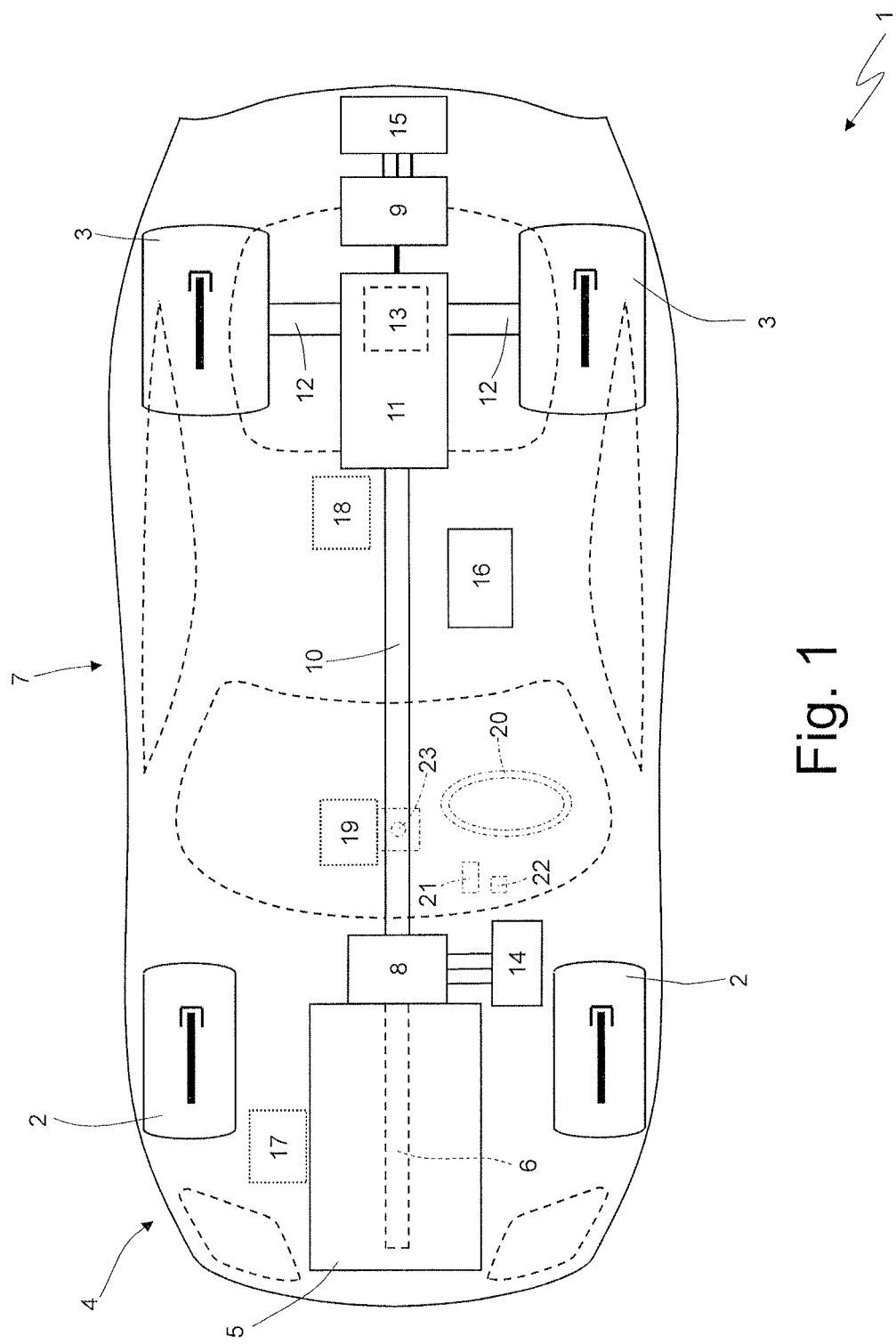
FIG. 1 is a schematic view of a hybrid vehicle provided with an electronically controlled transmission and manufactured according to the present invention.

In FIG. 1, reference number 1 indicates in its entirety a hybrid vehicle provided with two front wheels 2 and with two rear drive wheels 3, which receive the driving torque from a hybrid powertrain system 4.

The hybrid powertrain system 4 comprises an internal combustion heat engine 5 arranged in the front position and provided with a crankshaft 6, a transmission 7 which transmits the torque generated by the internal combustion engine 5 to the rear drive wheels 3 and two electric machines 8 and 9, which are mechanically connected to the transmission 7 and are reversible (i.e. they can operate both as an electric motor by absorbing electric energy and generating a mechanical torque and as an electric generator by absorbing mechanical energy and generating electric energy).

The transmission 7 comprises a transmission shaft 10, which on the one side is angularly integral with the crankshaft 6 and on the other side is mechanically connected to an electronically controlled transmission 11, which is arranged in the rear position and transmits the motion to the rear drive wheels 3 by means of two drive shafts 12 that receive the motion from a differential 13; the transmission 11 can be automatic or robotized (single-clutch or double-clutch) and then the gear change is performed by electrically controlled actuators.

The electric machine 8 is mechanically connected to the crankshaft 6 of the internal combustion heat engine 5, while the electric machine 9 is mechanically connected to the transmission 11 (e.g. a primary shaft of the transmission). The electric machine 8 is driven by an electronic continuous-AC power converter 14 (i.e. an "inverter") and the electric machine 9 is driven by an electronic continuous-AC power converter 15 (i.e. an "inverter"). Both electronic power converters 14 and 15 are electrically connected to an electric energy accumulation system 16 provided with chemical batteries.

It is provided a control unit 17 of the heat engine 5 that is physically installed in the front engine compartment to be arranged close to the heat engine 5, supervises the operation of the heat engine 5 and controls the heat engine 5 to pursue a torque objective and/or an rpm objective. Moreover, it is provided a control unit 18 of the transmission 11 that is physically installed in the rear position to be arranged close to the transmission 11, supervises the operation of the transmission 11 and controls the actuators of the transmission 11 to perform, when required, an upward or downward gear change.

The vehicle 1 has a passenger compartment, which can house the driver and any possible passenger, and has a driver's seat provided with a plurality of controls, which comprise a steering wheel 20, an accelerator pedal 21, a brake pedal 22 and a transmission lever 23 (better shown in FIGS. 2 and 3); by operating these controls, the driver controls the motion of the vehicle 1. In particular, the steering wheel 20 is used by the driver to adjust the transverse motion of the vehicle 1 (by varying the steering angle of the front wheels), while the accelerator pedal 21, the brake pedal 22 and the transmission lever 23 are used by the driver to adjust the longitudinal motion of the vehicle 1, i.e. to establish the travel direction (forward or backward) and to establish the longitudinal speed and, possibly, the longitudinal acceleration (which may be positive or negative).

The position of the accelerator pedal 21, the position of the brake pedal 22 and the position of the transmission lever 23 are read (directly or indirectly) by respective position sensors. In particular, it is provided an electronic control unit 19 of the transmission control means that is coupled to the transmission lever 23 and acquires the position of the transmission lever 23. As more clearly shown in FIG. 3, the electronic control unit 19 of the transmission control means comprises a hardware device 24 provided with a memory and with at least one microprocessor (generally at least two independent microprocessors are provided: a main microprocessor and a diagnostic microprocessor checking the proper operation of the main microprocessor) and a software 25 that is run by the hardware device 24 and acquires the position of the transmission lever 23, i.e. determines the current position of the transmission lever 23; moreover, the software 25 also determines the current position of any selectors or buttons associated with the transmission lever 23 and controls any light indicators associated with the transmission lever 23. In particular, the software 25 directly receives the raw signals coming from one or more position sensors coupled to the transmission lever 23 and performs the necessary processing to extract securely (i.e. even performing a diagnosis for detecting any possible error) and accurately the current position of the transmission lever 23 from these raw signals; subsequently, the software 25 makes available on the CAN network (i.e. "publishes" on the CAN network) the current position of the transmission lever 23.

In other words, the software 25 reads the raw signals coming from one or more position sensors coupled to the transmission lever 23, processes these raw signals to extract securely and accurately the current position of the transmission lever 23, and finally "publishes" on the CAN network the current position of the transmission lever 23. In this respect, please note that the software 25 performs congruence checks on the raw signals from the position sensors coupled to the transmission lever 23 for the necessary security and diagnosis checks. In short, the software 25 reads low level signals (i.e. the raw signals) from the position sensors coupled to the transmission lever 23 and processes them to obtain the corresponding high level signals (e.g. transmission lever 23 in "neutral", "drive", "reverse" position) that are "published" on the CAN network. As previously stated, the software 25 can detect and process even the current position of the selectors or buttons associated with the transmission lever 23; furthermore, the software 25 can actuate light indicators associated with the transmission lever 23 and/or can control actuators autonomously moving the transmission lever 23 or blocking the movement of the transmission lever 23 (e.g. by preventing the movement of the transmission lever 23 if the brake pedal 22 is not pressed).

The electronic control unit 19 of the transmission control means runs (in parallel with the software 25) also a further software 26 that fulfils the functions of directing and coordinating the heat engine 5, the transmission 11 and the electric machine 8, 9. In other words, the software 26 run in the electronic control unit 19 of the transmission control means receives the orders given by the driver and provides the control unit 17 of the heat engine 5, the control unit 18 of the transmission 11 and the electronic continuous-AC power converters 14 and 15 of the electric machines 8 and 9 with the corresponding objectives to meet in the most effective (i.e. ready) and energy-efficient way the driver's needs. Consequently, the software 26 run in the electronic control unit 19 of the transmission control means constitutes a vehicle management unit (also called VMU—"Vehicle Management Unit"). The vehicle management unit (i.e. the software 26 run in the electronic control unit 19 of the transmission control means in parallel with the software 25) determines the driver's motion needs based on the position of the accelerator pedal 21, on the position of the brake pedal 22 and on the position of the transmission lever 23, i.e. translates these positions into a longitudinal speed objective (with a direction, namely forward or backward) and, possibly, into a longitudinal acceleration objective for the vehicle 1.

Subsequently, the vehicle management unit (i.e. the software 26 run in the electronic control unit 19 of the transmission control means in parallel with the software 25) establishes how to pursue the longitudinal speed objective and the longitudinal acceleration objective by coordinating the heat engine 5, the transmission 11 and the electric machines 8 and 9, i.e. establishes a torque objective and an rpm objective (objectives which can also have null values, corresponding to the heat engine 5 shutdown) for the heat engine 5, establishes a transmission ratio objective (which can also have a neutral position) for the transmission 11, and establishes a torque objective (which may be positive by operating as an engine or negative by operating as a generator) and an rpm objective (objectives which can also have null values, corresponding to the electric machines 8 and 9 shutdown) for each electric machine 8 and 9.

As previously stated, the control unit 17 of the heat engine 5 is physically installed in the front engine compartment to be arranged close to the heat engine 5, while the control unit 18 of the transmission 11 is physically installed in the rear position to be arranged close to the transmission 11; consequently, the two control units 17 and 18 are physically separated from one another, are relatively distant from one another and communicate through the CAN network (known and not shown) of the vehicle 1 (the "Controller Area Network", also known as CAN-bus, is a serial standard for fieldbuses, mainly in the automotive, multicast environment, which was introduced in the eighties to connect various electronic control units). As shown more clearly in FIG. 2, the electronic control unit 19 of the transmission control means (also running the software 26 constituting the vehicle management unit) is physically installed in the passenger compartment of the vehicle 1 close to the transmission lever 23 and communicates with the two control units 17 and 18 and with the two electronic continuous-AC power converters 14 and 15 through the CAN network of the vehicle 1.

In short, the hardware device 24 (i.e. the electronic control unit 19 of the transmission control means) fulfils both the function of vehicle management through the software 26 and the function of acquiring the current position of the transmission lever 23 thanks to the software 25. Both software products 25 and 26 are run in parallel (or simultaneously) by the same hardware device 24. In other words, the function of vehicle management (software 26) and the function of acquiring the current position of the transmission lever 23 (software 25) are integrated in the same hardware device 24, i.e. in the same electronic control unit 19 of the transmission control means.

Figure 2:
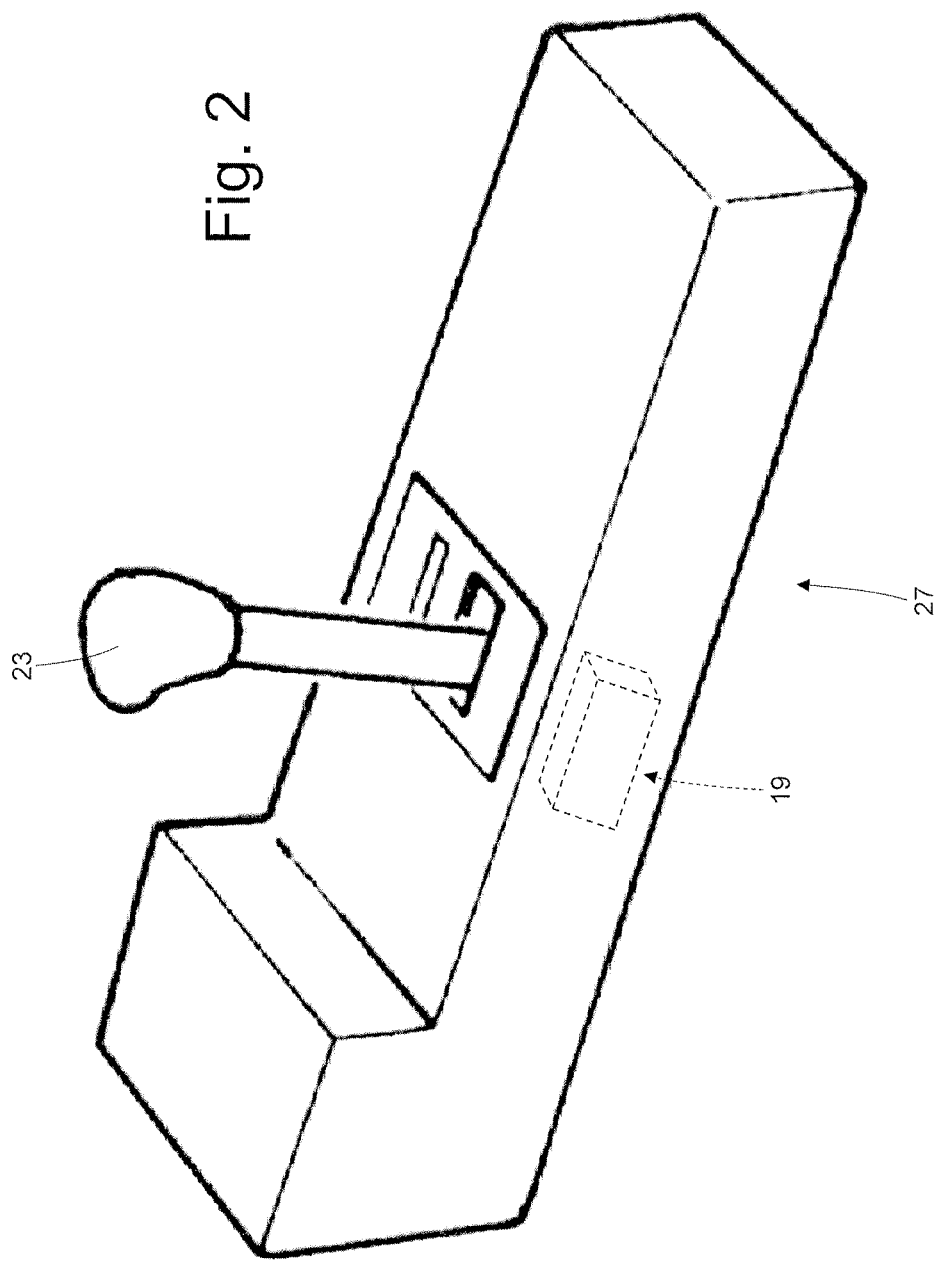
FIG. 2 is a schematic view of a transmission lever of the vehicle of FIG. 1.
Figure 3:
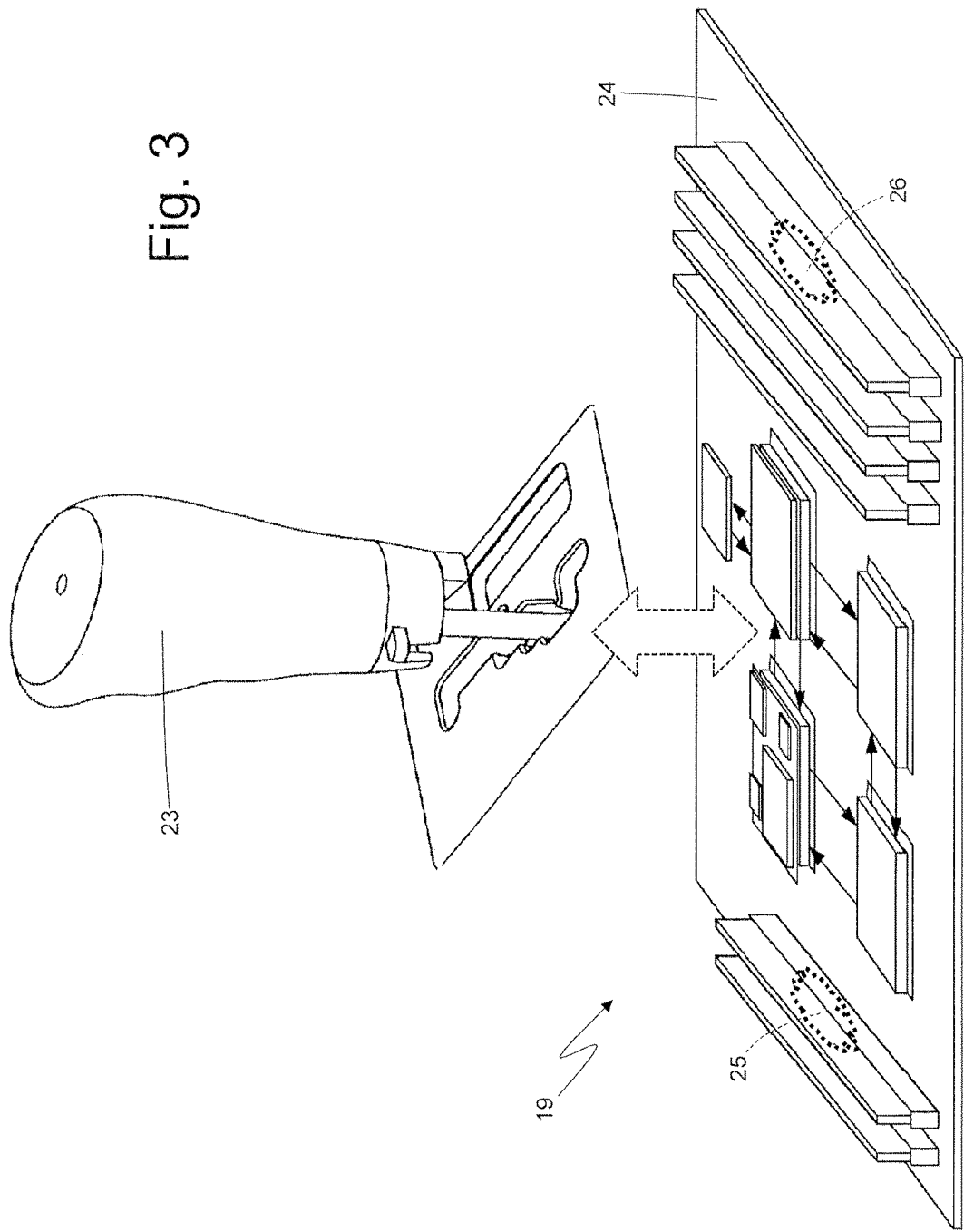
FIG. 3 is a schematic view of an electronic control unit of the transmission control means of the vehicle of FIG. 1.

According to a preferred embodiment shown in FIG. 2, the hardware device 24 is physically installed close to the transmission lever 23 in a central tunnel 27 supporting the transmission lever 23. In this way, the hardware device 24 could be directly wired both to the sensors detecting the position of the transmission lever 23 and to the sensors detecting the position of the pedals 21 and 22; alternatively, the sensors detecting the position of the transmission lever 23 could also be directly integrated in the hardware device 24 or could form a single assembly together with the hardware device 24.

In the embodiment described above, the driver controls the operation of the transmission through a lever-shaped command (i.e. the transmission lever 23); according to a different and perfectly equivalent embodiment, the driver controls the operation of the transmission through a differently shaped command, e.g. shaped as a rotatable knob, or as buttons. In other words, the transmission control means may be shaped as a lever or as a knob or buttons. Moreover, in combination with the lever or with the knob, the transmission control means may also comprise a pair of blades mounted on the steering wheel 20 to request a gear change.

As also shown in FIG. 4, the electronic control unit 19 of the transmission control means (i.e. a single hardware device 24 physically installed close to the transmission lever 23) fulfils the function of vehicle management unit through the software 26, and at the same time fulfils the function of acquiring the current position of the transmission lever 23 thanks to the software 25; in other words, the vehicle management unit and the unit for acquiring the current position of the transmission lever are integrated in a single hardware device 24 (in a single electronic control unit 19 of the transmission control means) that fulfils both functions. The vehicle management unit notifies to the two control units 17 and 18 and the two electronic continuous-AC power converters 14 and 15 the corresponding objectives to be pursued. Moreover, the vehicle management unit communicates to the control unit 18 of the transmission 11 the current position of the transmission lever 23.

The aforesaid vehicle 1 has several advantages.

First, the arrangement of the vehicle management unit in the passenger compartment (thus integrating it in the electronic control unit 19 of the transmission control means) optimizes the positioning of the vehicle management unit with respect to all the components to be connected. In fact, the vehicle management unit must receive signals from the position sensors coupled to controls controlled by the driver and, at the same time, must interact through a CAN network with the two control units 17 and 18 and with the two electronic continuous-AC power converters 14 and 15.

Moreover, the arrangement of the vehicle management unit in the passenger compartment (thus integrating it in the electronic control unit 19 of the transmission control means) reduces the thermal stresses to which the vehicle management unit is subjected; in fact, regulations require a maximum temperature of 105° C. in the engine compartment, while regulations require a maximum temperature of 85° C. in the passenger compartment. The cost of the components of the vehicle management unit may thus be reduced, though obtaining the same performance.

Finally, the integration in the electronic control unit 19 of the transmission control means of the vehicle management unit allows to avoid the installation of a further electronic control unit exclusively dedicated to the vehicle management unit with a significant saving; in fact, in currently commercially available vehicles, an electronic control unit exclusively dedicated to the acquisition of the position of the transmission lever 23 has a relatively complex hardware including two microprocessors and can also fulfil the function of vehicle control unit without requiring any significant hardware upgrade.

The invention claimed is:

1. A hybrid vehicle (1) comprising:
    at least one pair of drive wheels (2);
    an internal combustion heat engine (5);
    an electronically controlled transmission (11), which transmits a torque from the heat engine (5) to the drive wheels (2);
    at least one electric machine (8, 9), which can be connected to the drive wheels (2);
    an electronic power converter (14, 15), which controls the electric machine (8, 9);
    an electronic control unit (17) of the heat engine (5), which supervises the operation of the heat engine (5) and controls the heat engine (5) to pursue a torque objective and/or an rpm objective;
    an electronic control unit (18) of the transmission (11), which supervises the operation of the transmission (11) and controls the transmission (11) to perform, if required, a gear shift;
    an interior provided with a plurality of controls, which can be operated by a driver and comprise a steering wheel (20), an accelerator pedal (21), a brake pedal (22) and transmission control lever (23);
    an electronic control unit (19) of the transmission control lever, which is physically installed in the interior close to the transmission control lever (23) and fulfils the function of acquiring the current position of the transmission control lever (23) by directly receiving and thus processing the raw signals coming from at least one position sensor coupled to the transmission control lever (23); and
    a vehicle management unit, which receives orders given by the driver and provides the control unit (17) of the heat engine (5), the control unit (18) of the transmission (11) and the electronic power converter (14, 15) with the corresponding objectives to follow the driver's orders;
    wherein a vehicle control unit is integrated in the electronic control unit (19) of the transmission control lever so that the electronic control unit (19) of the transmission control lever also fulfils the function of vehicle management unit by receiving the orders given by driver and by providing the electronic control unit (17) of the heat engine (5), the electronic control unit (18) of the transmission (11) and the electronic power converter (14, 15) with the corresponding objectives to meet the driver's needs.

2. The vehicle (1) according to claim 1, wherein the electronic control unit (19) of the transmission control lever comprises:
    a hardware device (24) provided with a memory and with at least one microprocessor;
    a first software (25), which is run by the hardware device (24) and fulfils the function of acquiring the position of the transmission control lever (23) by processing the raw signals provided by the position sensor coupled to the transmission control lever (23), so as to safely and precisely obtain the position of the transmission control lever (23); and
    a second software (26), which is run by the hardware device (24) in parallel with the first software (25) and fulfils the function of vehicle management unit, namely the second software (26) directs and coordinates the heat engine (5), the transmission (11) and the electric machine (8, 9).

3. The vehicle (1) according to claim 1, wherein the vehicle management unit integrated in the electronic control unit (19) of the transmission control lever determines driver's motion needs based on the position of the accelerator pedal (21), the position of the brake pedal (22) and the position of the transmission control lever (23), namely the electronic control unit (19) of the transmission control lever translates these positions into a longitudinal speed objective and into a longitudinal acceleration objective for the vehicle (1).

4. The vehicle (1) according to claim 3, wherein the vehicle management unit integrated in the electronic control unit (19) of the transmission control lever establishes how to pursue the longitudinal speed objective and the longitudinal acceleration objective by coordinating the heat engine (5), the transmission (11) and the electric machine (8, 9).

5. The vehicle (1) according to claim 3, wherein the vehicle management unit integrated in the electronic control unit (19) of the transmission control lever establishes the torque objective and the rpm objective for the heat engine (5), a gear ratio objective for the transmission (11) and a torque objective and an rpm objective for the electric machine (8, 9).

6. The vehicle (1) according to claim 1, wherein the electronic control unit (19) of the transmission control lever is physically installed in a central tunnel (27) supporting the transmission control lever (23).

7. The vehicle (1) according to claim 1, wherein:
    the electronic control unit (17) of the heat engine (5) is physically installed in an engine compartment to be arranged close to the heat engine (5) and communicates with the vehicle management unit integrated in the electronic control unit (19) of the transmission control lever through a CAN network; and
    the electronic control unit (18) of the transmission (11) is physically installed close to the transmission (11) and communicates with the vehicle management unit integrated in the electronic control unit (19) of the transmission control lever through the CAN network.

* * * * *